United States Patent [19]

Zhou

[11] Patent Number: 5,595,272
[45] Date of Patent: Jan. 21, 1997

[54] UNIDIRECTIONAL CLUTCH

[75] Inventor: Rao-Sheng Zhou, Canal Fulton, Ohio

[73] Assignee: The Timken Company, Canton, Ohio

[21] Appl. No.: 428,035

[22] Filed: Apr. 25, 1995

[51] Int. Cl.$^6$ .................................................. F16D 41/064
[52] U.S. Cl. .......................................... 192/45; 188/82.84
[58] Field of Search ............................ 192/45; 188/82.84

[56] References Cited

U.S. PATENT DOCUMENTS

| | | |
|---|---|---|
| 2,835,364 | 5/1958 | Picard . |
| 3,012,645 | 12/1961 | Gensheimer et al. ............. 192/45 |
| 3,087,591 | 4/1963 | Whitney et al. . |
| 3,187,863 | 6/1965 | Giometti . |
| 3,623,581 | 11/1971 | Livezey . |
| 4,039,058 | 8/1977 | Trzebiatowski . |
| 4,187,937 | 2/1980 | Kitchin . |
| 4,236,619 | 12/1980 | Kuroda . |
| 4,754,859 | 7/1988 | Ouchi et al. . |
| 4,989,705 | 2/1991 | Kashio et al. . |
| 4,995,490 | 2/1991 | Kanai ................................... 192/45 |
| 5,099,972 | 3/1992 | Ouchi . |

FOREIGN PATENT DOCUMENTS

| | | |
|---|---|---|
| 2206619 | 8/1972 | Germany . |
| 1103539 | 2/1968 | United Kingdom . |

Primary Examiner—Richard M. Lorence
Attorney, Agent, or Firm—Polster, Lieder, Woodruff & Lucchesi, L.C.

[57] ABSTRACT

A unidirectional clutch permits relative rotation in only one direction between a housing and a shaft that extends into the housing. The clutch includes bearings between the shaft and housing, a cylindrical friction surface on the shaft and a retainer in the housing, with the retainer surrounding the friction surface. The retainer, which is keyed to the housing and is relatively long, has pockets which open toward the friction surface. Each pocket is in part defined by a ramp which lies oblique to the friction surface, giving the pocket a large region and a small region. Each pocket contains a roller which is small enough to fit loosely in the large region and too large to fit into the small end. At each end of the retainer channels open laterally, and these channels contain pistons and springs, with the latter urging the former against the rollers in the pockets to urge the rollers toward the small regions of the pockets. End rings fit against the ends of the retainer and close the pockets to capture the rollers and likewise close the channels to hold the pistons and springs in place. The clutch permits relative rotation between the shaft and housing in the direction which tends to drag the rollers toward the large regions of the pockets, but in the reverse direction the rollers lodge between the retainer and the friction surface and transfer torque between the housing and shaft.

16 Claims, 1 Drawing Sheet

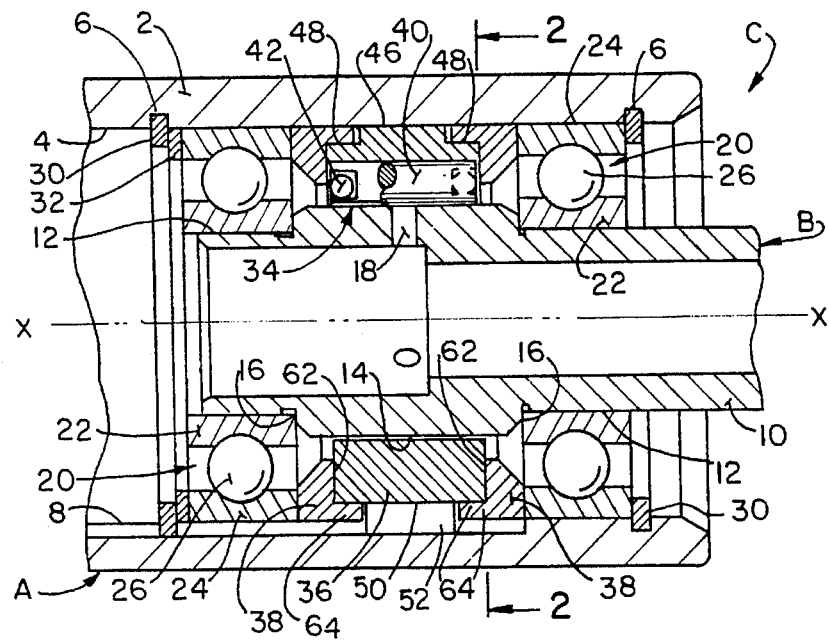
FIG. 1
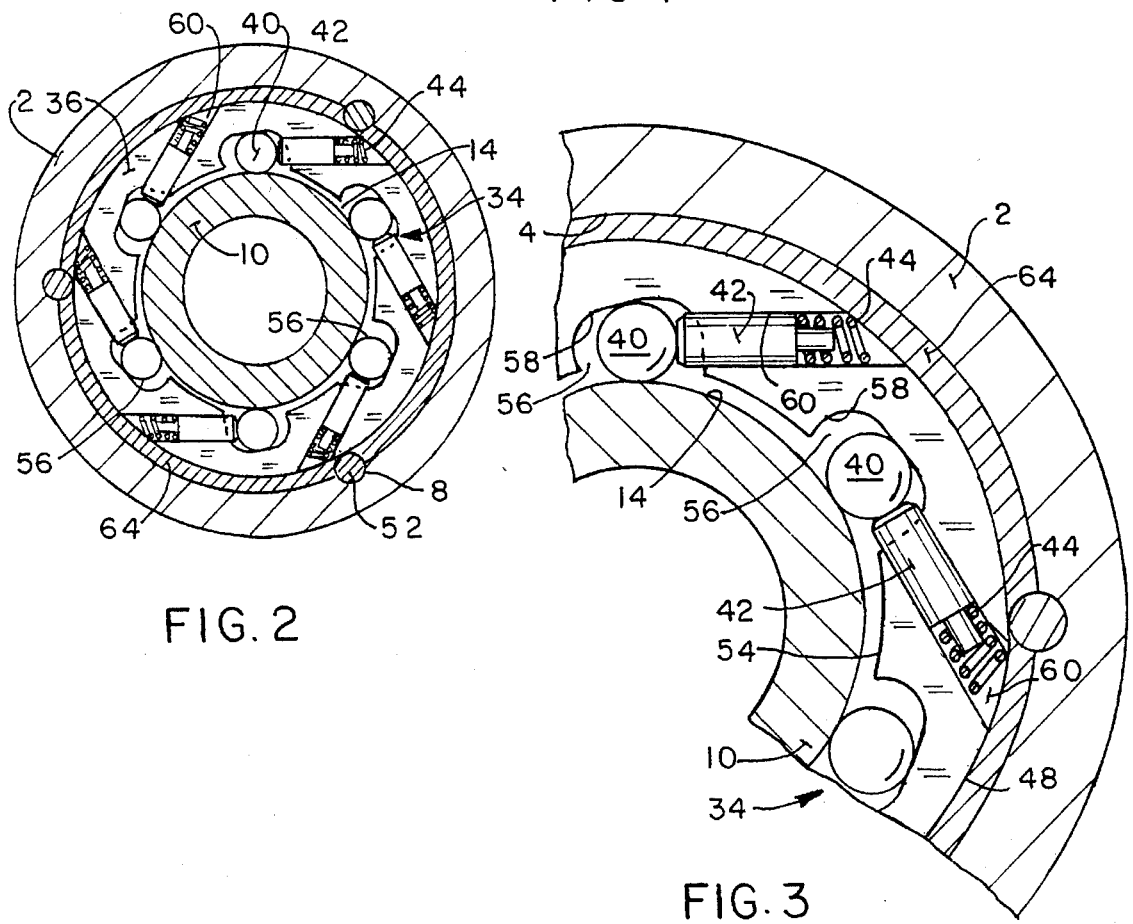
FIG. 2
FIG. 3

UNIDIRECTIONAL CLUTCH

BACKGROUND OF THE INVENTION

This invention relates in general to clutches and more particularly to a clutch that permits relative rotation in only one direction.

Some machines contain shafts which must rotate in only one direction, while others have shafts which may only overrun other shafts. In either case some type of clutch is required to, in effect, allow relative rotation between the shafts in only one direction. Indeed, in the opposite direction of rotation the clutch must have the capacity to transfer torque from one shaft to another.

The typical one-way or unidirectional clutch contains locking elements which lie in pockets located between two shafts. In one direction of relative rotation, the elements float in the pockets and do not impede the relative rotation. Hence, the one shaft will rotate relative to or overrun the other shaft. In the other direction the elements lodge between converging surfaces, which form the pockets, and transmit torque from the one shaft to the other. Usually springs urge the rolling elements lightly against the converging surfaces so that when a reversal in direction occurs, the shafts immediately lock up to transfer torque. The locking elements are usually balls or rollers and almost always rollers when the torque is high, with the length of the rollers to a large measure depending on the magnitude of the torque. But rollers, particularly long ones, tend to skew between the converging surfaces at the pockets, and for this reason are often confined in cages. Cages add to the complexity and cost of the clutches.

The present invention resides in a unidirectional clutch which contains elongated rollers to transmit torque, yet does not rely on a cage to prevent the rollers from skewing. The clutch is quite compact and easy to manufacture.

DESCRIPTION OF THE DRAWING

In the accompanying drawings which form part of the specification and wherein like numerals and letters refer to like parts wherever they occur:

FIG. 1 is a longitudinal sectional view of a clutch constructed in accordance with and embodying the present invention;

FIG. 2 is a transverse sectional view taken along line 2—2 of FIG. 1; and

FIG. 3 is an enlarged fragmentary sectional view, likewise taken along line 2—2 of FIG. 1.

DETAILED DESCRIPTION

Referring now to the drawings a unidirectional clutch C (FIG. 1) unites two components A and B of a machine, one of which lies within the other at least within the region of the clutch C. The clutch C permits relative rotation between the components A and B about an axis X, but only in one direction. Indeed, one component may rotate and the other may be fixed, or more likely both may rotate. In any event, the clutch C enables one of the machine components to rotate relative to the other component in only one direction, and in that sense the clutch C likewise serves as a bearing. When torque is applied to effect relative rotation in the opposite direction, the clutch C locks the two components A and B together and indeed transfers the applied torque between the components A and B. For example, the inner component B may rotate at a predetermined velocity, owing to torque applied to it, and the outer component A at a greater velocity in the same direction, in effect, overrunning the inner component B. Should the angular velocity of the outer component A diminish to that of the inner component B, the clutch C will engage the inner component B with the outer component A and transfer the torque applied to the former to the latter. The two components A and B when engaged will, of course, rotate at the same angular velocity about the axis X.

The outer component A includes (FIG. 1) a tubular housing 2 having a cylindrical interior surface 4 out of which two annular grooves 6 open, as well as axially directed keyways 8 which also take the form of grooves. The inner component B at its end takes the form of a hollow shaft 10 which projects into the hollow interior of the housing 2. The shaft 10 has two outwardly presented bearing seats 12 and a raised friction surface 14 located between the seats 12. Indeed, each seat 12 ends at a shoulder 16 and the friction surface 14 lies between the two shoulders 16. The shaft 10 contains several radially directed holes 18 which extend from the hollow interior to the raised surface 14 and indeed open out of that surface.

The housing 2 rotates around the shaft 10 or vice versa on two antifriction bearings 20 (FIG. 1) which likewise occupy the interior of the housing 2. Each antifriction bearing 20 includes an inner race 22, an outer race 24, and rolling elements 26 which are located between the inner and outer races 22 and 24 and roll along raceways on those races 22 and 24. The raceways are configured such that they capture the rolling elements 26 both axially and radially, and as a consequence the bearings 20 have the capacity to take light axial or thrust loads as well as radial loads. Traditional ball bearings will suffice for the bearings 20 (as illustrated) as will tapered roller bearings. The inner races 22 of the bearings 20 fit around the seats 12 in the shaft 10 and against the shoulders 16 at the ends of those seats 12. The outer races 24, on the other hand, fit into the housing 2 where they lie snugly along the cylindrical surface 4 between the two annular grooves 6. Indeed, the grooves 6 receive snap rings 30 which project beyond the cylindrical surface 4 and retain the bearings 20 in the housing 2. While one of the bearings 20 at its outer race 24 bears directly against one of the snap rings 30, the outer race 24 of the other bearing 20 and the other snap ring 30 are separated by a wave spring 32 which eliminates free motion between the bearings 20 and the housing 2 and likewise between the shaft 10 and housing 2 in the axial direction. The bearings 20 maintain the shaft 10 and housing 2 concentric about the axis and prevent the axial displacement of one relative to the other, yet enable the housing 2 to rotate on the shaft 10, or the shaft 10 to rotate in the housing 2.

While the bearings 20 accommodate relative rotation between the housing 2 and shaft 10, they do not restrict rotation in either direction. The capacity to prevent rotation in one direction while allowing it to occur in the other resides in a clutch assembly 34 (FIGS. 1–3) which is located in the housing 2 around the raised surface 14 of the shaft 10. Actually, the raised surface 14 forms part of the clutch assembly 34 which also includes an annular retainer 36 which fits into the housing 2, end rings 38 which fit between the retainer 36 and the bearing 20, and rollers 40 which fit loosely into the retainer 36 and are confined axially by the end rings 38. The clutch assembly 34 further includes small pistons 42 which fit into the retainer 36 and springs 44 which urge the pistons 42 against the rollers 40.

The retainer 36 has a cylindrical exterior surface 46 (FIG. 1) and rabbets 48 at the ends of that surface 46. The diameter of the surface 46 is about the same as the diameter of the interior surface 4 for the housing 2, so the retainer 36 fits snugly within the housing 2. Opening out of the exterior surface 46 are keyways 50 which align with the keyways 8 in the housing 2, and the aligned keyways 8 and 50 receive keys 52 which prevent the retainer 36 from rotating relative to the housing 2. The retainer 36 encircles the raised friction surface 14 on the shaft 10, it having a generally cylindrical inner surface 54 which is slightly larger than the raised surface 14 of the shaft 10, yet the surfaces 14 and 54 are concentric. The inner surface 54 is not continuous, but is instead interrupted by roller pockets 56 (FIG. 2) which extend axially in retainer 36 from one end to the other. As their name implies, the roller pockets 56 receive the rollers 40, there being a separate roller 40 in each pocket 56. The rollers 40, which are cylindrical and elongated, extend substantially the entire length of their respective pockets 56, but do not project out of the ends of the pockets 56 (FIG. 1).

Each pocket 56 is defined in part by a ramp 58 (FIG. 3) which is presented toward cylindrical friction surface 14 on the shaft 10, yet converges slightly with respect to the friction surface 14. Hence, the ramp 58 lies oblique to the friction surface 14 and the pocket 56 has a large region and a small region. The roller 40 for the pocket 56 fits loosely in the large region of the pocket 56, but will not fit into the small region. As a consequence, the roller 40 will lodge between the oblique ramp 58 and the cylindrical friction surface 14 of the shaft 10 somewhere between the large and small regions of the pocket 56.

Between its pockets 56, the retainer 36 has channels 60 (FIG. 3) which extend obliquely from the large ends of the pockets 56 to the rabbets 48. The oblique channels 60 lie at both ends of the retainer 36 and open out of the end faces of the retainer 36. The pistons 42 fit into the channels 60 just loosely enough to slide easily within them without binding. The springs 44, which are of the coil-type compression variety, also fit into the channels 60 behind the pistons 42 and urge the pistons 42 against the rollers 40 in the pockets 56. Being at the ends of the retainer 36, the springs 44 exert light biasing forces on the rollers 40 near the ends of the rollers 40, with the forces being transmitted through the pistons 42, so each spring 44 and its piston 42 constitutes a biasing element. The biasing forces urge the rollers 40 toward the small regions of the roller pockets 56, so that each roller 40 along its cylindrical surface remains against the oblique ramp 58 for its pocket 56 and against the raised friction surface 14 of the shaft 10. Even though the pistons 42 project into the pockets 56, they are for the most part contained in and confined by the channels 60.

The end rings 38 lie captured between the outer races 24 of the two bearings 20 and the retainer 36 (FIG. 1). They fit snugly into the interior surface 4 of the housing 2 and have shoulders 62, which bear against the ends of the retainer 36, and annular ribs 64, which project beyond the shoulders 62 into the rabbets 48 of the retainer 36. The shoulders 62 close the sides of the pockets 56 and the sides of the channels 60, at least sufficiently to prevent the rollers 40 from moving out of the ends of the pockets 56 and to prevent the pistons 42 and springs 44 from slipping out of the sides of the channels 60. The ribs 64, on the other hand, close the outer ends of the channels 60 and serve as backings for the springs 44 (FIG. 3).

In operation, the outer component A will rotate around the inner component B or the inner component B will rotate within the outer component A in the direction which tends to drag the rollers 40 toward the large region of their respective roller pockets 56. Even so, the rollers 40 remain against—although not lodged between—the ramps 58 of their pockets 56 and the cylindrical friction surface 14 on the shaft 10, owing to the bias of the springs 44. Since the biasing forces are applied near the ends of the rollers 40, the rollers 40 do not tend to skew in the pockets 56, notwithstanding the tendency to drag them into the large region of the pockets 56. But when the direction of relative rotation is reversed, the rollers 40 lodge tightly between the oblique ramps 58 of their respective pockets 56 and the cylindrical friction surface 14 on the shaft 10. This has the effect of locking the components A and B together so that torque will be transmitted from one to the other.

This invention is intended to cover all changes and modifications of the example of the invention herein chosen for purposes of the disclosure which do not constitute departures from the spirit and scope of the invention.

What is claimed is:

1. A clutch for permitting relative rotation in only one direction about an axis, said clutch comprising: a friction surface located around the axis with its center being the axis; a retainer located circumferentially along the friction surface and having pockets which open toward the friction surface, each pocket having a ramp which is located slightly oblique to the friction surface, whereby each pocket has a large region and a small region, the retainer also having channels which open into the large regions of the pockets at both sides of those pockets; a roller located in each pocket, the roller being too large to fit into the small region of its pocket and small enough to fit loosely into the large region of the pocket, whereby the roller will lodge between the ramp and the friction surface intermediate the large and small regions of the pocket, the rollers all being of substantially the same length and equal in number to the pockets; biasing elements in the channels and contacting the rollers near the ends of the rollers so that each roller is acted upon by two biasing elements, the biasing elements bearing against the rollers and urging the rollers toward the small regions of their pockets, so that the rollers remain lodged between the ramps of their respective pockets and the friction surface, whereby torque applied to the friction surface or retainer in one direction will tend to drag the rollers toward the large regions of the pockets and relative rotation will occur between the friction surface and the retainer, and torque applied in the opposite direction will cause the rollers to lodge between the ramps and the friction surface where they will provide the only coupling between the friction surface and retainer and thus transfer the torque between the friction surface and the retainer.

2. A clutch according to claim 1 wherein each biasing element includes a piston which projects from its channel into the large region of the pocket into which the channel opens and a spring which urges the piston towards the roller that is in the pocket into which the piston projects.

3. A clutch according to claim 1 wherein the friction surface is cylindrical.

4. A clutch according to claim 3 wherein the friction surface is on a shaft and is presented outwardly away from the axis; and wherein the retainer is annular and encircles the friction surface with its pockets opening inwardly toward the axis.

5. A clutch according to claim 4 wherein the retainer is located within a housing; and further including at least one bearing between the housing and shaft.

6. A clutch according to claim 4 where two bearings are between the shaft and housing, and the friction surface and retainer are located between the bearings.

7. A clutch according to claim 1 wherein the pockets open axially out of the ends of the retainer and further comprising end rings located against the ends of the retainer and closing the ends of the pockets without receiving any portion of the rollers.

8. A clutch for permitting relative rotation in only one direction about an axis, said clutch comprising: a friction surface located around the axis with its center being the axis; a retainer located along the friction surface and having pockets which open toward the friction surface and also laterally out of the ends of the retainer, each pocket having a ramp which is located slightly oblique to the friction surface, whereby each pocket has a large region and a small region, the retainer also having channels which open into the large regions of the pockets at both sides of those pockets and also laterally out of the ends of the retainer; a roller located in each pocket, the roller being too large to fit into the small region of its pocket and small enough to fit loosely into the large region of the pocket, whereby the roller will lodge between the ramp and the friction surface intermediate the large and small regions of the pocket; biasing elements in the channels and contacting the rollers, the biasing elements bearing against the rollers and urging the rollers toward the small regions of their pockets, so that the rollers remain lodged between the ramps of their respective pockets and the friction surface, whereby torque applied to the friction surface or retainer in one direction will tend to drag the rollers toward the large regions of the pockets and relative rotation will occur between the friction surface and the retainer, and torque applied in the opposite direction will cause the rollers to lodge between the ramps and the friction surface and transfer the torque between the friction surface and the retainer; end rings located against the ends of the retainer and closing the pockets sufficiently to retain the rollers in them and closing the channels sufficiently to retain the biasing elements in them.

9. A clutch according to claim 8 wherein each biasing element includes a piston which projects from its channel into the large region of the pocket into which the channel opens and a spring which urges the piston toward the roller that is in the pocket into which the piston projects.

10. A clutch according to claim 8 wherein the retainer has rabbets; wherein the channels extend between the pockets and the rabbets; and wherein the end rings extend into the rabbets and cover the ends of the channels.

11. A clutch for permitting relative rotation in only one direction about an axis, said clutch comprising: a shaft having a cylindrical friction surface that is located around and presented away from the axis with its center being the axis; an annular retainer encircling the friction surface and having pockets which open inwardly toward the axis and the friction surface and also laterally out of the ends of the retainer, each pocket having a ramp which is located slightly oblique to the cylindrical friction surface, whereby each pocket has a large region and a small region, the retainer also having channels which open into the large regions of the pockets at both sides of those pockets and also laterally out of the ends of the retainer; a roller located in each pocket, the roller being too large to fit into the small region of its pocket and small enough to fit loosely into the large region of the pocket, whereby the roller will lodge between the ramp and the friction surface intermediate the large and small regions of the pocket; biasing elements in the channels and contacting the rollers, the biasing elements bearing against the rollers and urging the rollers toward the small regions of their pockets, so that the rollers remain lodged between the ramps of their respective pockets and the friction surface, whereby torque applied to the friction surface or retainer in one direction will tend to drag the rollers toward the large regions of the pockets and relative rotation will occur between the friction surface and the retainer, and torque applied in the opposite direction will cause the rollers to lodge between the ramps and the friction surface and transfer the torque between the friction surface and the retainer; and end rings located against the ends of the retainer to close the pockets sufficiently to retain the rollers in them and to close the channels sufficiently to retain the biasing elements in them.

12. A clutch according to claim 11 wherein each biasing element includes a piston which projects from its channel into the large region of the pocket into which the channel opens and a spring which urges the piston toward the roller that is in the pocket into which the piston projects.

13. In combination with a first machine component having a housing and a second machine component including a shaft with projects into the housing, a clutch for permitting relative rotation between the shaft and housing about the axis, said clutch comprising: bearings located around the shaft and within the housing for permitting relative rotation between the machine components; a cylindrical friction surface carried by the shaft; a retainer located within and carried by the housing such that it cannot rotate with respect to the housing, the retainer being located around the friction surface and including pockets which open toward the friction surface, each pocket being defined in part by a ramp that is located obliquely to the friction surface so that the pocket has a large region and a small region, the retainer also having channels which open laterally out of the ends of the retainer and also into the large regions of the pockets; rollers located in the pockets, the rollers being too large to fit into the small regions of their respective pockets and small enough to fit loosely into the large regions of their respective pockets, whereby the rollers will lodge between the ramps of their pockets and the friction surface somewhere between the large and small regions of the pockets; and springs in the channels of the retainer and exerting forces on the rollers near the ends of the rollers, with the forces being directed such that they urge the rollers toward the small regions of the pockets, so that the rollers remain against the ramps of the retainer and the friction surface on the shaft, whereby torque applied to one of the machine components in one direction will tend to drag the rollers toward the large ends of the pockets and relative rotation will occur between the machine components and torque applied in the opposite direction will cause the rollers to lodge between the ramps and the friction surface and transfer the torque between the machine components.

14. The combination according to claim 13 and further comprising end rings at the ends of the retainer where they close the pockets sufficiently to retain the rollers in the pockets and the channels sufficiently to retain the springs in the channels.

15. The combination according to claim 14 wherein the retainer has outwardly opening rabbets and the channels also open into the rabbets, and the end rings extend over the rabbets and close the ends of the channels.

16. The combination according to claim 14 and further comprising springs in the channels and projecting into the pockets and against the rollers, the springs acting on the pistons, whereby the forces exerted by the springs are transmitted to the rollers through the pistons.

* * * * *